Dec. 19, 1939.  B. O. AUSTIN  2,183,762

MOTOR CONTROL SYSTEM

Filed June 28, 1938

Sequence Table

WITNESSES:

INVENTOR
Bascum O. Austin.
ATTORNEY

Patented Dec. 19, 1939

2,183,762

UNITED STATES PATENT OFFICE 2,183,762

MOTOR CONTROL SYSTEM

Bascum O. Austin, Forest Hills, Pa., assignor to Westinghouse Electric & Manufacturing Company, East Pittsburgh, Pa., a corporation of Pennsylvania Application June 28, 1938, Serial No. 216,279

7 Claims. (Cl. 172—179)

My invention relates, generally, to motor control systems, and, more particularly, to systems for controlling the operation of the propelling motors of electric vehicles, such as street cars and trolley coaches.

An object of my invention, generally stated, is to provide a motor control system which shall be simple and efficient in operation and which may be economically manufactured and installed.

A more specific object of my invention is to provide an automatic series-parallel control system for two or more electric motors.

Another object of my invention is to provide an improved transition from series operation to parallel operation of electric motors.

A further object of my invention is to provide an interlock progression system for automatically controlling the acceleration of electric motors during series-parallel operation.

Other objects of my invention will be explained more fully hereinafter or will be apparent to those skilled in the art.

In accordance with the invention, the operation of the transition switches in a motor control system is controlled by progressive interlocking independently of the limit relay, thereby obtaining a smooth transition from series to parallel operation of the motors without losing tractive effort sufficiently to cause uneven acceleration of the vehicle.

Figure 1:
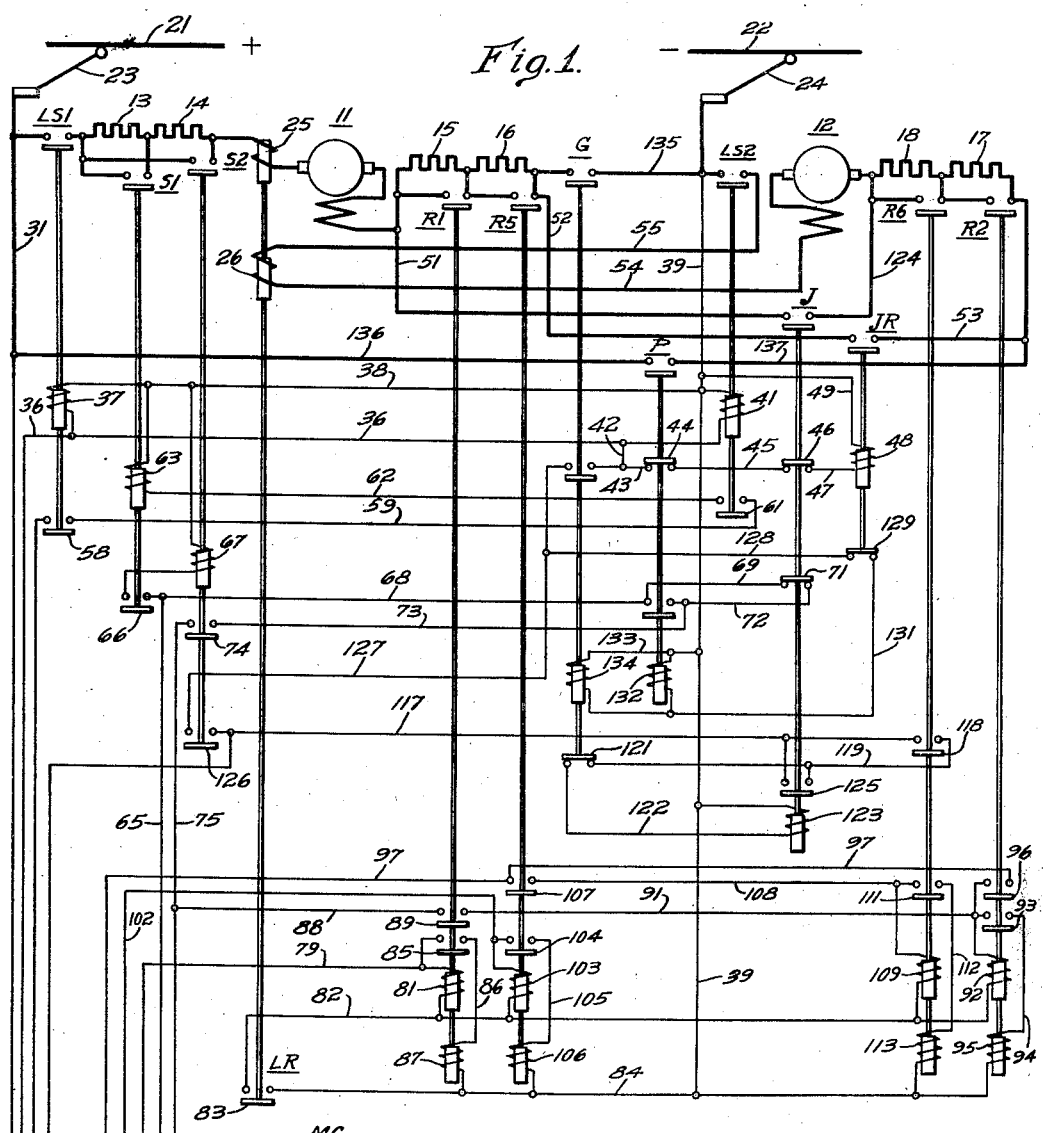
Figure 2:
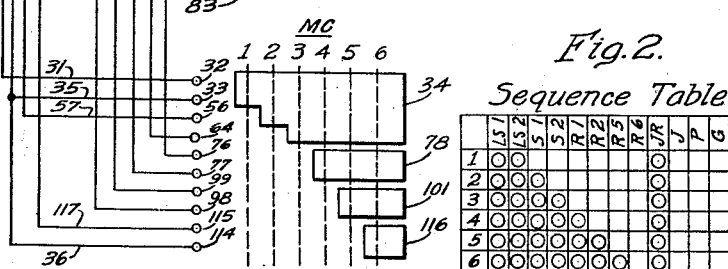

For a fuller understanding of the nature and objects of the invention, reference may be had to the following detailed description, taken in conjunction with the accompanying drawing, in which:

Figure 1 is a diagrammatic view of a control system embodying the invention; and Fig. 2 is a chart showing the sequence of operation of a portion of the apparatus illustrated in Fig. 1.

Referring to the drawing, the system illustrated therein comprises a pair of electric motors 11 and 12 which may be of the series type usually utilized for propelling electric vehicles, a pair of line switches LS1 and LS2 and a switch JR for connecting the motors 11 and 12 to a power source in series-circuit relation for accelerating the vehicle, additional switches J, P and G for changing the motor connections from series to parallel-circuit relation, a plurality of resistors 13 to 18, inclusive, for controlling the motor current during acceleration, a plurality of switches S1, S2, R1, R2, R5 and R6 for shunting the foregoing resistors in a manner well known in the art to govern the acceleration of the motors, a master controller MC, which may be of the well known drum type, and a limit relay LR, which is responsive to the motor current and controls the operation of the resistor shunting switches to limit the motor current during the accelerating period.

The power for operating the motors 11 and 12 may be supplied through power conductors 21 and 22, which are engaged by current collecting devices 23 and 24, respectively, mounted on the vehicle (not shown).

In order to increase the speed of operation of the limit relay LR, it is provided with two actuating coils 25 and 26, as shown. The coils 25 and 26 are both connected in the series circuit for the motors 11 and 12 during series operation of the motors. During parallel operation of the motors, one of the coils is connected in each branch of the parallel circuit. In this manner the relay is always connected in the motor circuit and is responsive to the full motor current. Any unbalance of current in the motors during parallel operation does not affect the operation of the relay, since one of the relay coils is in each branch of the motor circuit whereas relays of previous types having only one actuating coil have been connected in only one branch of the motor circuit during parallel operation of the motors.

The sequence of operation of the resistor shunting switches R1, R2, R5 and R6 is controlled by interlock progression, as will be explained more fully hereinafter. In order to simplify the equipment required for controlling the operation of these switches, each switch is provided with a closing coil for operating the switch and a holding coil for retaining the switch in the closed position after it has been operated by the closing coil. As explained hereinbefore, the time of operation of the resistor shunting switches is governed by the limit relay LR in a manner to control the motor current during the accelerating period. In order to simplify the drawing and description of the present application, only a few resistor shunting switches have been shown. It will be understood that the number of resistor shunting or accelerating switches may be increased if desired.

In previous control systems of the type herein disclosed, it has been difficult to obtain a smooth transition from series operation to parallel operation of the motors without losing sufficient tractive effort to cause uneven acceleration of the vehicle. In the present scheme, in which bridging transition is utilized, the sequence and the time of operation of the transition switches is governed entirely by interlocks on the switches and is independent of the limit relay LR, thereby avoiding improper and delayed transitions, which cause uneven acceleration of the vehicle. The transition is started independently of the limit relay LR when the last series notch or step is taken. The transition switches J, JR, P and G are so interlocked that there is a delay of three times the time required to operate a single contactor before the transition is complete. Oscillograph records show that this timing is such that there is practically no change in the motor current from series to parallel operation of the motors. In this manner an even and smooth transition is provided, thereby improving the performance and riding characteristics of the vehicle.

In order that the functioning of the foregoing apparatus may be more clearly understood, the operation of the system will now be described in more detail. Assuming that it is desired to accelerate the vehicle to its maximum speed, the master controller MC is actuated to position "6", thereby causing the motors to be connected first in series-circuit relation and then automatically connected in parallel-circuit relation at the proper time in the accelerating period. It will be understood that if it is desired to connect the motors only in series-circuit relation the controller MC may be actuated to position "5", thereby stopping the progression of the control equipment when the series acceleration is completed. Likewise, the motors may be operated at still slower speeds by actuating the controller MC to one of the intermediate positions "2", "3" or "4" to stop the progression at an intermediate point, thereby retaining part of the accelerating resistors in the motor circuit.

As indicated in the sequence chart shown in Fig. 2, the switches LS1, LS2 and JR are closed on the first step of acceleration to connect the motors 11 and 12 to the power source in series-circuit relation, and in series with all of the accelerating resistors. The energizing circuit for the switch LS1 may be traced from the positive conductor 21 through the current collecting device 23, a conductor 31, contact fingers 32 and 33 bridged by a segment 34 on the controller MC, conductors 35 and 36, the actuating coil 37 of the switch LS1, conductors 38 and 39 and the current collecting device 24 to the negative conductor 22. The energizing circuit for the switch LS2 extends from the conductor 36 through the actuating coil 41 to the negative conductor 39. The energizing circuit for the switch JR extends from the conductor 36 through conductors 42 and 43, an interlock 44 on the switch P, conductor 45, an interlock 46 on the switch J, conductor 47, the actuating coil 48 of the switch JR and conductor 49 to the negative conductor 39.

The closing of the switches LS1, LS2 and JR connects the motors 11 and 12 to the power source through a circuit which may be traced from the positive conductor 31 through the switch LS1, resistors 13 and 14, the actuating coil 25 of the limit relay LR, the motor 11, conductor 51, the resistors 15 and 16, conductor 52, the switch JR, conductor 53, the resistors 17 and 18, the motor 12, conductor 54, the actuating coil 26 of the relay LR, conductor 55 and the switch LS2 to the negative conductor 39.

Following the closing of the switches LS1, LS2 and JR, the switch S1 is closed to shunt the resistor 13 from the motor circuit. The energizing circuit for the switch S1 may be traced from a contact finger 56 which engages the segment 34 of the controller MC, through conductor 57, an interlock 58 on the switch LS1, conductor 59, an interlock 61 on the switch LS2, conductor 62, the actuating coil 63 of the switch S1 and conductor 38 to the negative conductor 39.

The switch S2 is closed to shunt the resistor 14 after the switch S1 is closed. The energizing circuit for the switch S2 extends from a contact finger 64 on the controller MC, through conductor 65, an interlock 66 on the switch S1, the actuating coil 67 of the switch S2 and conductor 38 to the negative conductor 39.

Following the closing of the switch S2 the switch R1 is closed under the control of the limit relay LR to shunt the resistor 15. The energizing circuit for the switch R1 may be traced from the previously energized conductor 65 through conductors 68 and 69, an interlock 71 on the switch J, conductors 72 and 73, an interlock 74 on the switch S2, conductor 75, contact fingers 76 and 77 bridged by a segment 78 on the controller MC, conductor 79, the closing coil 81 of the switch R1, conductor 82, the contact members 83 of the limit relay LR and conductor 84 to the negative conductor 39. The closing of the switch R1 energizes the holding coil for this switch through a circuit which extends from the conductor 79 through an interlock 85 on the switch R1, conductor 86, the holding coil 87 and conductor 84 to the negative conductor 39.

The switch R2 is closed by interlock progression after the switch R1 is closed. The energizing circuit for the switch R2 extends from the conductor 75 through conductor 88, an interlock 89 on the switch R1, conductor 91, the closing coil 92 of the switch R2, conductor 82 and contact members 83 on the relay LR and conductor 84 to the negative conductor 39. The closing of the switch R2 energizes its holding coil through a circuit which extends from the conductor 91 through an interlock 93 on the switch R2, conductor 94, the holding coil 95 and conductor 84 to the negative conductor 39.

Likewise, the switch R5 is closed by interlock progression after the switch R2 is closed. The energizing circuit for the switch R5 may be traced from the previously energized conductor 91 through an interlock 96 on the switch R2, conductor 97, contact fingers 98 and 99 bridged by segment 101 on the controller MC, conductor 102, the closing coil 103 of the switch R5, conductor 82, the contact members 83 of the limit relay LR and conductor 84 to the negative conductor 39. The holding coil for the switch R5 is energized by the closing of the switch R5 through a circuit which extends through conductor 103, an interlock 104, conductor 105, the holding coil 106 and conductor 84 to the negative conductor 39.

Following the closing of the switch R5 the switch R6 is closed to shunt the last step of accelerating resistance from the motor circuit. The energizing circuit for the switch R6 may be traced from the previously energized conductor 97 through an interlock 107 on the switch R5, conductor 108, the closing coil 109 of the switch R6, conductor 82, the contact members 83 of the limit relay LR and conductor 84 to the negative conductor 39. The closing of the switch R6 energizes its holding coil through a circuit which extends from the conductor 108 through an interlock 111, conductor 112, the holding coil 113 and conductor 84 to the negative conductor 39.

As explained hereinbefore, transition from series to parallel operation takes place automatically after the closing of the switch R6. Furthermore, the operation of the transition switches is not dependent upon the operation of the limit relay LR as is the operation of the resistor shunting switches R1, R2, R5 and R6. The energizing circuit for the transition switch J may be traced from the previously energized conductor 36 through contact fingers 114 and 115 bridged by a segment 116 on the controller MC, conductor 117, an interlock 118 on the switch R6, conductor 119, an interlock 121 on the switch G, conductor 122, and the actuating coil 123 of the switch J to the negative conductor 39.

The closing of the switch J establishes a bridging circuit for the motors 11 and 12 through conductors 51 and 124, thereby permitting the series switch JR and the resistor shunting switches R1, R2, R5 and R6 to be opened as a result of the deenergization of the holding circuits for these switches by the opening of interlocks carried by the switch J. A holding circuit is established for the switch J by the closing of this switch. The holding circuit may be traced from the conductor 117 through an interlock 125 on the switch J, conductor 119, the interlock 121 on the switch G, conductor 122 and the actuating coil 123 of the switch J to the negative conductor 39.

Following the opening of the switch JR, which takes place after the closing of the switch J as explained hereinbefore, the switches P and G are closed to connect the motors in parallel-circuit relation. The energizing circuit for the switch P may be traced from the previously energized conductor 117 through an interlock 126 on the switch S2, conductors 127 and 128, an interlock 129 on the switch JR, conductor 131, the actuating coil 132 of the switch P and conductor 133 to the negative conductor 39. The energizing circuit for the switch G extends from the conductor 131 through the actuating coil 134 and conductor 133 to the negative conductor 39.

The closing of the switch G opens the interlock 121 on this switch, thereby interrupting the holding circuit for the switch J and permitting this switch to open to complete the transition from series to parallel operation of the motors, which are now connected to the power source in parallel-circuit relation. However, the accelerating resistors 15, 16, 17 and 18 are now connected in the motor circuits. The circuit for the motor 11 may be traced from the power conductor 31 through the switch LS1, switches S1 and S2, the actuating coil 25 of the limit relay LR, the motor 11, the resistors 15 and 16, the switch G, and conductor 135 to the negative conductor 39. The circuit for the motor 12 extends from the power conductor 31 through conductor 136, the switch P, conductor 137, the resistors 17 and 18, the motor 12, conductor 54, the actuating coil 26 of the relay R, conductor 55 and the switch LS2 to the negative conductor 39.

It will be noted that the operation of the switches J, P and G during the transition period is entirely independent of the limit relay LR, the time of operation, as well as the sequence of operation being governed entirely by the closing of the proper interlocks on the respective switches to establish the energizing circuits for the actuating coils of the switches. In this manner delaying of the transition by the limit relay is avoided and, as previously explained, the proper timing is obtained to provide an even and smooth transition.

Following the completion of the transition the switches R1, R2, R5 and R6 are again closed in sequential relation under the control of the limit relay to shunt the resistors 15, 16, 17 and 18 from the motor circuit in the manner hereinbefore described, thereby connecting the motors directly across the power source in parallel-circuit relation.

Furthermore, one of the actuating coils of the limit relay LR is connected in each branch of the motor circuit during the parallel acceleration of the motors. In this manner the satisfactory operation of the relay is not affected by an unbalance in the motor current, thereby ensuring the proper functioning of the relay.

From the foregoing description it is apparent that I have provided an automatic series parallel control system for two or more motors which is economical in the amount of apparatus required and which provides a greatly improved transition from series operation to parallel operation.

I do not desire to be restricted to the particular form or arrangement of parts herein shown and described, since it is evident that they may be changed and modified without departing from the spirit and scope of my invention as defined in the appended claims.

I claim as my invention:

1. In a motor control system, in combination, a plurality of motors, power conductors, switching means for connecting the motors to the power conductors in series-circuit relation, and transition switches for changing the motors from series to parallel-circuit relation, the operation of said transition switches being controlled by interlocks actuated by said switching means and said transition switches.

2. In a motor control system, in combination, a plurality of motors, power conductors, switching means for connecting the motors to the power conductors in series-circuit relation, transition switches for changing the motors from series to parallel-circuit relation, and interlocking means actuated by said switching means and said transition switches for controlling the sequence of operation of said transition switches.

3. In a motor control system, in combination, a plurality of motors, power conductors, switching means for connecting the motors to the power conductors in series-circuit relation, additional switching means for controlling the acceleration of the motors, a relay responsive to the motor current for controlling the operation of said additional switching means, transition means for changing the motors from series to parallel-circuit relation, and interlocking means for controlling the operation of said transition means independently of said relay.

4. In a motor control system, in combination, a plurality of motors, power conductors, switching means for connecting the motors to the power conductors in series-circuit relation, additional switching means for controlling the acceleration of the motors, a relay responsive to the motor current for controlling the operation of said additional switching means, transition switches for changing the motors from series- to parallel-circuit relation, and interlocking means for controlling the sequence and the time of operation of said transition switches independently of said relay.

5. In a motor control system, in combination, a plurality of motors, power conductors, switching means for connecting the motors to the power conductors in series-circuit relation, additional switching means for controlling the acceleration of the motors, a relay responsive to the motor current for controlling the operation of said additional switching means, transition switches for changing the motors from series to parallel-circuit relation, and interlocking means actuated by said switching means and said transition switches for controlling the sequence and the time of operation of said transition switches independently of said relay.

6. In a motor control system, in combination, a pair of electric motors, power conductors, switching means for connecting the motors to the power conductors in series-circuit relation, additional switching means for controlling the acceleration of the motors, a relay responsive to the motor current for controlling the operation of said additional switching means, and transition means for changing the motors from series to parallel-circuit relation, said relay having an actuating coil disposed in each branch of the motor circuit during parallel operation of the motors.

7. In a motor control system, in combination, a pair of electric motors, power conductors, switching means for connecting the motors to the power conductors in series-circuit relation, a plurality of switches for controlling the acceleration of the motors, said accelerating switches having closing coils and holding coils disposed thereon, interlocking means on the accelerating switches for controlling their sequence of operation, a relay responsive to the motor current for controlling the energization of the closing coils of the accelerating switches, transition means for changing the motors from series to parallel-circuit relation, and interlocking means for controlling the operation of said transition means independently of said relay.

BASCUM O. AUSTIN.